Nov. 19, 1957  E. W. HAWKINSON  2,813,304
MOLD CONSTRUCTION
Filed June 30, 1954
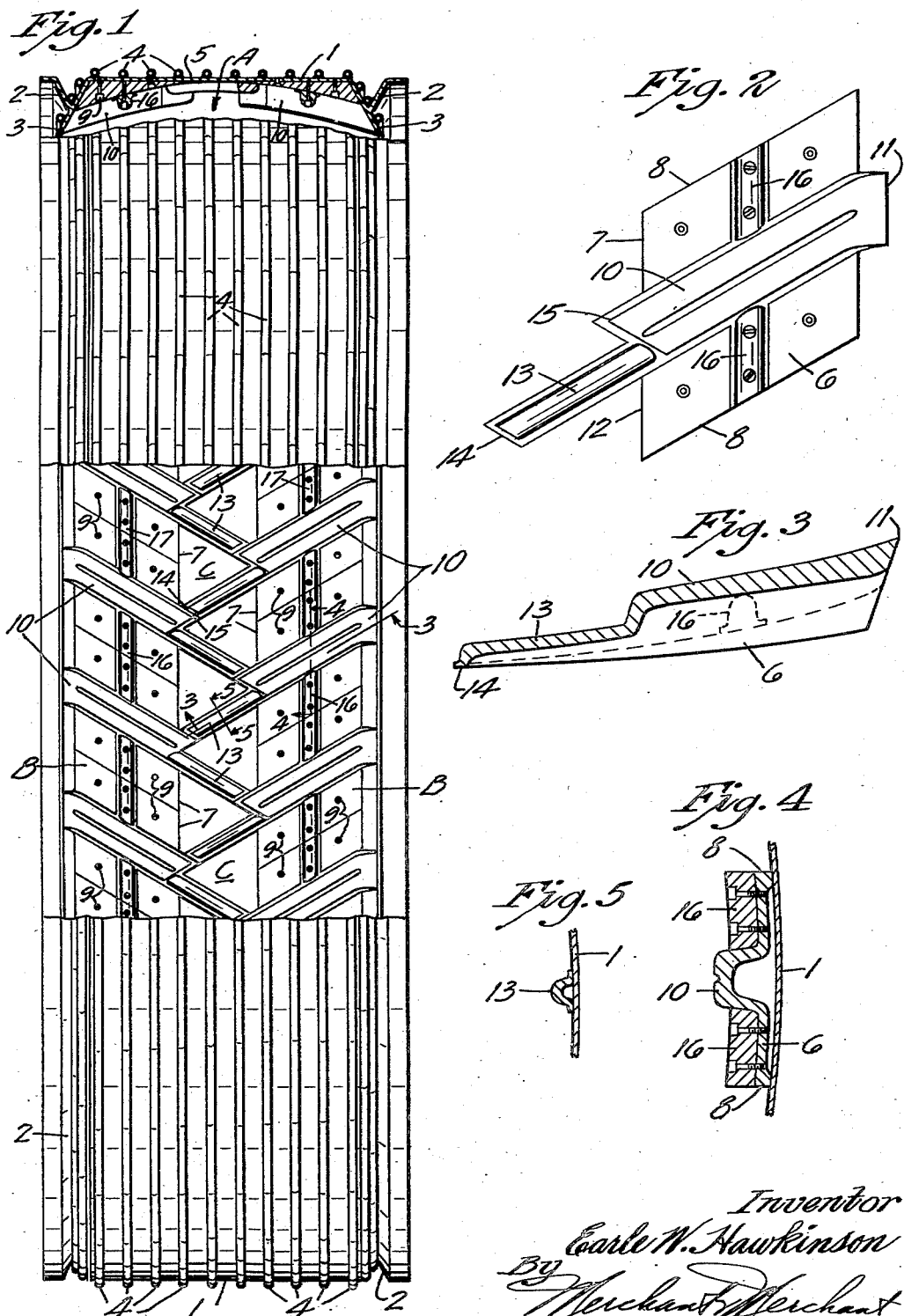
Inventor
Earle W. Hawkinson
By Merchant & Merchant
Attorneys

2,813,304
Patented Nov. 19, 1957

2,813,304
MOLD CONSTRUCTION

Earle W. Hawkinson, Minneapolis, Minn., assignor to Paul E. Hawkinson Company, Minneapolis, Minn., a corporation of Minnesota Application June 30, 1954, Serial No. 440,500

2 Claims. (Cl. 18—38)

My invention provides improvements in tire retreading molds of the type disclosed in Patent No. 1,917,262.

More particularly, my invention relates to novel means for forming a tread molding cavity of cross-sectionally arcuate shape from a cylindrical sheet metal shell or band having laterally spaced radially inwardly projecting tread material confining flanges.

Still more specifically, my invention provides a novel endless mold for use in practicing the so-called "Hawkinson" method wherein the beads of the tire are spread laterally at circumferentially spaced points to reduce said casing in circumference to enter it into and remove it from a retread mold of less diameter than the normal diameter of said casing. To this end I provide matrix elements or inserts in the shape of parallelograms which are secured to the internal peripheral surface of the band-like mold member in side by side relationship to provide two laterally spaced circumferential matrix members which increase in thickness progressively from their opposed feather edges to their outer edges in engagement with the tread material confining flanges.

An important object of my invention is the provision of a device of the class described which is relatively simple to construct, is strong and durable in use and is relatively easy to provide with different designs.

The above and still further objects of my invention will become apparent from the following detailed specification, appended claims, and attached drawings.

Referring to the drawings wherein like characters indicate like parts throughout the several views:

Fig. 1 is a view partly in front elevation and partly in transverse section, some parts being broken away;

Fig. 2 is a perspective view of one of the matrix elements;

Fig. 3 is an enlarged view in longitudinal section taken substantially on the line 3—3 of Fig. 1;

Fig. 4 is a view in transverse section taken on the line 4—4 of Fig. 1; and

Fig. 5 is a fragmentary section taken on the line 5—5 of Fig. 1.

Referring with greater particularity to the drawings, the numeral 1 indicates in its entirety an annular cylindrical band formed from suitable sheet metal, and formed at its opposite edges to provide radially inwardly projecting tread material confining flanges 2 of general V-shape in cross section. The numeral 3 indicates an extension flange of the type disclosed and claimed in my prior Patent No. 2,662,244; and the numeral 4 indicates a continuous heating conduit soldered or otherwise rigidly secured to the outer peripheral surface 5 of the band 1, all as more specifically illustrated in Patent No. 2,651,078.

The molding cavity formed by the band 1 with its confining flanges 2 and extension flange 3 is identified by the letter A. Into the molding cavity A, a plurality of matrix elements 6 are placed in side by side relationship to form a pair of laterally spaced continuous matrix members B. The space between the matrix members B is identified by the numeral C. As shown, particularly by reference to Fig. 3, it will be noted that the matrix elements 6 increase in radial depth continuously from their opposed feathered opposite edges 7 as shown in Figs. 1 and 2, to their points of engagement respectively with the cooperating confining flange 2. Also it will be noted that the matrix elements 6 are quadrangular in shape, their abutting edges 8 extend at obtuse angles to the axial dimension of the band 1, the sides 8 of the matrix 6 and one of the matrix members B converging with respect to the sides 8 of the matrix element 6 making up the other matrix member B. The matrix elements 6 are rigidly secured to the band 1 by means of suitable screws or bolts 9. In this manner, it will be noted, particularly by reference to Fig. 1, that a mold cavity of cross sectionally arcuate contour, as distinguished from a mold of cylindrical contour, is produced.

Quite obviously, the matrix elements 6 readily mold with any desired design-forming relief thereon. Preferably, and as shown, the matrix elements 6 making up the opposed matrix members B are staggered with respect to each other and each thereof is provided with design-forming central ribs 10 which are of constant width from their outer ends 11, which engage the sides of the V-shaped confining flanges 2 to substantially their feathered edges 12. A reduced portion 13 of the ribs 10 projects into the space C between the matrix members B and each thereof terminates in an outer end 14 in engagement with the angular portion 15 of a staggered rib 10 in the maxtrix element 6 in the opposite matrix member B. It will be noted that in this novel manner a continuous zig-zag is formed by the reduced portions 13 of the rib 10 within the space C. Also preferably and as shown, bars 16 are secured to the matrix elements 6 and intervene between the ribs 10 whereby to provide a pair of parallel rows of bars 17. By reference to Fig. 3, it will be noted that the ribs 10 also increase in axial thickness from the inner ends 14 to their outer ends 11.

My invention has been thoroughly tested and found to be completely satisfactory for the accomplishment of the above objects and while I have shown a preferred embodiment thereof, I wish it to be specifically understood that same is capable of modification without departure from the scope of the appended claims.

What I claim is:

1. A tire retreading mold comprising an endless cylindrical band of sheet metal having laterally spaced tread material confining flanges which project radially inwardly from its marginal edges, a plurality of quadrangular matrix elements secured to the inner peripheral surface of said band in side by side relation and forming a pair of laterally spaced parallel matrix members which extend circumferentially around said band, said matrix members having feathered opposite edges and increasing in radial depth continuously therefrom to their points of engagement with said confining flanges, whereby to form a mold cavity of arcuate cross section, said matrix elements being provided with radially inwardly projecting design-forming ribs which extend into and terminate within the space between said matrix members, said design-forming ribs at their points of engagement with their respective confining flanges having a radial thickness corresponding approximately to the radial depth of said flanges.

2. The structure defined in claim 1 in which the abutting sides of said matrix elements extend at oblique angles to the axial dimension of the band, said design-forming ribs within the space between said matrix members forming a continuous zig-zag.

References Cited in the file of this patent

UNITED STATES PATENTS

| | | |
|---|---|---|
| 1,868,959 | Willshaw et al. | July 26, 1932 |
| 2,174,189 | Heintz | Sept. 26, 1939 |
| 2,333,588 | Schaevitz | Nov. 2, 1943 |
| 2,618,812 | Hulswit et al. | Nov. 25, 1952 |
| 2,659,933 | Hawkinson | Nov. 24, 1953 |